| United States Patent [19] | [11] Patent Number: 4,490,979 |
| Reynolds | [45] Date of Patent: Jan. 1, 1985 |

[54] VEHICLE BRAKING SYSTEM

[75] Inventor: Desmond H. J. Reynolds, Birmingham, England

[73] Assignee: Lucas Industries Limited, Birmingham, England

[21] Appl. No.: 413,074

[22] Filed: Aug. 30, 1982

[30] Foreign Application Priority Data

Oct. 27, 1981 [GB] United Kingdom ............... 8132384

[51] Int. Cl.³ ......................... F15B 7/08; B60T 13/14
[52] U.S. Cl. ....................................... 60/581; 60/551; 60/589; 60/591
[58] Field of Search ................ 60/581, 589, 591, 588, 60/548, 551, 567

[56] References Cited

U.S. PATENT DOCUMENTS 3,885,391  5/1975  Campbell et al. ................... 60/581
4,006,593  2/1977  Edwards .............................. 60/581
4,205,734  6/1980  Ostrowski ............................ 60/581
4,231,224  11/1980 Edwards et al. .................... 60/581
4,408,805  10/1983 Edwards et al. .................... 60/581

Primary Examiner—Robert E. Garrett
Assistant Examiner—H. Edward
Attorney, Agent, or Firm—Scrivener, Clarke, Scrivener and Johnson

[57] ABSTRACT

In a vehicle braking system of the kind in which brakes mounted on opposite sides of the vehicle are associated with respective pedals (1) and can be operated together for normal vehicle retardation or independently to assist vehicle steering, the brakes are connected to respective chambers (14, 15) of a tandem master cylinder (5) through respective control devices (7) which are actuated by the pedals (1) and control communication between the respective chambers (14, 15) and a reservoir.

10 Claims, 4 Drawing Figures

VEHICLE BRAKING SYSTEM

This invention relates to vehicle braking systems, and in particular to a braking system of the kind in which brakes mounted on opposite sides of the vehicle are associated with respective pedals which are selectively operable either together for normal in line braking, or independently to assist steering. Such systems are commonly provided on agricultural tractors and similar vehicles.

In a known system of the above kind disclosed in U.S. Pat. No. 4,205,734, the two pedals are arranged to operate the actuating rod of a common master cylinder which supplies fluid to the brakes on opposite sides of the vehicle via respective valves which are controlled by the pedals. Depressing either pedal actuates the master cylinder and opens up communication between the latter and the corresponding brake. This known system is not without drawbacks. The pedals are linked by a rod which is pivoted to the pedals at its ends and to the actuating rod of the master cylinder at its mid point. Consequently a given pedal effort applied to one pedal will produce a braking pressure which is substantially equal to that generated when the same effort is applied to each pedal simultaneously, although the pedal travel will be increased. It is sometimes preferable to have an increased braking pressure on single pedal operation, e.g. for locking the wheel at one side of the vehicle to execute a so-called "spin-turn", while a lower pressure is produced when all the brakes are actuated to achieve gradual retardation of the vehicle. Another drawback of the known system is that if one pedal is depressed for steering purposes and then the other pedal is depressed only slightly, the closed selector valve is opened and the braking pressure can fall sharply with a corresponding loss of braking.

According to the present invention there is provided a braking system of the kind initially described wherein there are two fluid pressure sources connected to the brakes on opposite sides of the vehicle and actuable in unison by a common actuating member which is operable by the pedals either independently or together, and each source is connected to a reservoir through a respective control device coupled to one of the pedals so that depressing the pedal interrupts the connection between the pressure source and reservoir.

When both pedals are operated fluid is supplied to the brakes from the associated pressure sources, their connections to reservoir being closed off.

If only one pedal is depressed, the control device associated with the other pedal maintains the associated pressure source in communication with the reservoir so that this source does not provide any resistance to the pedal movement and an increased pressure is generated in the operative source without any increase in pedal effort.

Another disadvantage of the known system described above is that the selector valves normally close off communication between the brakes and the reservoir. In a preferred embodiment of the present invention the fluid sources and brakes normally communicate with the reservoir so that thermal expansion and contraction of the fluid is unrestricted.

A better understanding of the invention will be had from the following detailed description given with reference to the accompanying drawings, in which.

Figure 1:
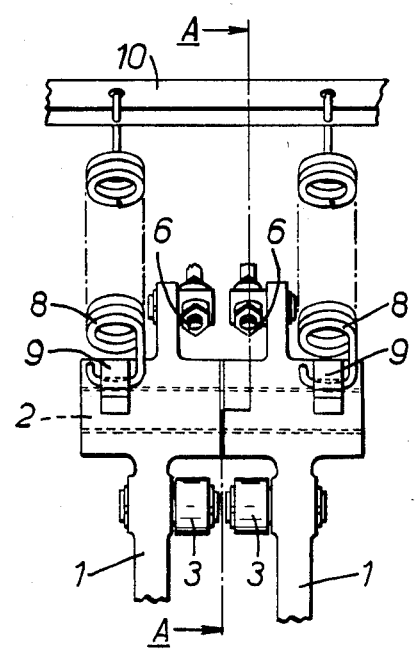
FIG. 1 is an elevational view illustrating an assembly forming part of a braking system in accordance with the invention.
Figure 2:
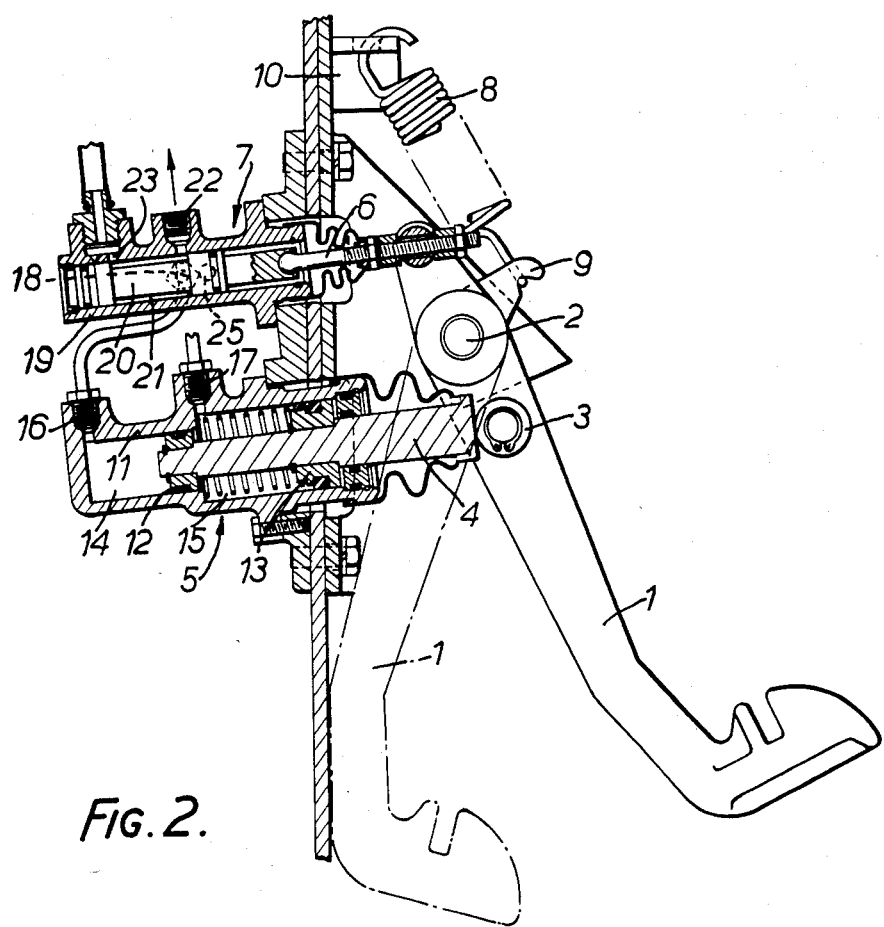
FIG. 2 is a section taken along the line A—A in FIG. 1.

Referring to FIGS. 1 and 2, two pedals 1 are shown mounted on a pivot 2 for independent movement about the pivot axis. The pedals carry opposed rollers 3 arranged to bear against the actuating rod 4 of a tandem master cylinder 5. The upper end of each pedal is connected pivotally and adjustably to the control rod 6 of a respective selector valve 7, and a return spring 8 acts between a finger 9 on each pedal and a bracket 10 fixed to the support structure.

The master cylinder 5 comprises a body 11 with a stepped bore, and pistons 12, 13 fixed on the rod 4 and slidable in the bore to define with body 11 two pressure chambers 14,15 having respective ports 16,17 which are connected to the inlet ports 18 of the respective selector valves 7.

Each selector valve 7 has a body 19 with a bore in which a piston 20 slides. The piston includes an intermediate portion of reduced diameter defining with body 19 a valve chamber 21 into which port 18 opens, and the control rod 6 is connected to the piston through a universal coupling. Each selector valve includes a port 22 which is connected to the brake (not shown) at the corresponding side of the vehicle, and a port 23 which is connected to a system reservoir (not shown).

In the normal brakes off condition, as illustrated in FIG. 2, each pressure chamber 14,15 communicates with the reservoir via the valve chamber 21 of the associated selector valve 7, and the brakes similarly communicate with the reservoir via the selector valves 7. If the pedals 1 are depressed together towards the position shown in broken lines in FIG. 2 and against the action of their return springs 8, the rollers 3 act on the end of rod 4 driving it inwardly to push forward the pistons 12,13. At the same time the pedals pull the control rods 6 of the selector valves 7 to displace the pistons 20 to the right as seen in FIG. 2, thereby closing off the ports 23 connecting the valve chambers 21 to the reservoir. Thereafter fluid displaced from the master cylinder chambers 14,15 by the pistons 12,13 flows through the ports 22 of the selector valves to actuate the brakes on either side of the vehicle.

If only one pedal e.g. the right hand pedal seen in FIG. 2, is depressed the actuating rod 4 of the master cylinder is still driven forwardly, but only the selector valve controlled by the depressed pedal is operated to close communication with the reservoir, the other selector valve remaining open because its associated pedal has not been operated to displace the valve piston. As a result, the fluid displaced by piston 12 of the master cylinder flows from the chamber 14 and to the brake at the corresponding i.e. righthand side of the vehicle via the closed selector valve, whereas the fluid displaced from chamber 15 by the piston 13 is directed to reservoir through the open selector valve and there is no pressure generated to operate the brakes at the other, left hand side of the vehicle. As the fluid in chamber 15 is not pressurised it does not offer any resistance to the pedal displacement so, for a given pedal effect, a greater braking pressure is generated in chamber 14 than that which is generated in the chambers 14,15 when both pedals are depressed together. This increased braking pressure allows a braked wheel to be locked more easily for steering purposes. It will be understood that when the other, lefthand pedal is depressed chamber 14 remains in communication with the reservoir while chamber 15 is pressurised to operate the brakes at the left side of the vehicle. The pistons 12,13 preferably have equal effective areas in which case the increase in pressure generated on single pedal operation will be approximately double.

In order to compensate for uneven wear and unequal clearances in the brakes on opposite sides of the vehicle, so that the same brake torque is obtained during normal braking, the selector valves 7 may be provided with additional ports 25 interconnected with each other and arranged to be opened by the pistons 20 only when the corresponding ports 23 leading to reservoir have been shut off. Thus, when both pedals are operated the selector valve chambers will be brought into direct communication for pressure equalisation. Alternatively, a tandem master cylinder in which the pistons are capable of limited movement with respect to each other to equalise the pressures in the two chambers could be used with the same effect. A suitable master cylinder is that shown in FIG. 1 of British Pat. No. 1,354,987.

Figure 3:
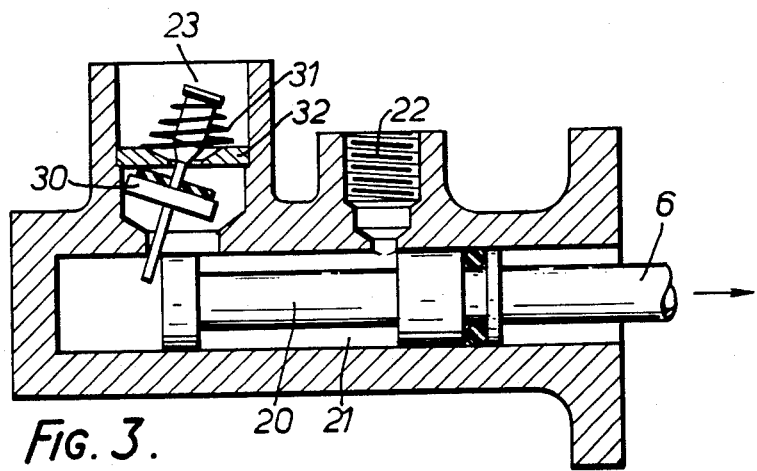
FIG. 3 shows a modified selector valve.

In the modified selector valve shown in FIG. 3 the piston 20 is arranged to operate a tipping valve 30 rather than close off the port leading to reservoir itself. The valve 30 is urged by a spring 31 towards seat 32 but is normally held open, as shown, by the piston 20 engaging the valve stem. When the piston is displaced to the right the valve closes. This form of valve has the advantage that when it is closed the pressure in the valve chamber 21 increases the force with which the valve member 30 engages its seat to minimise the risk of braking pressure being lost due to fluid leaking to reservoir.

Figure 4:
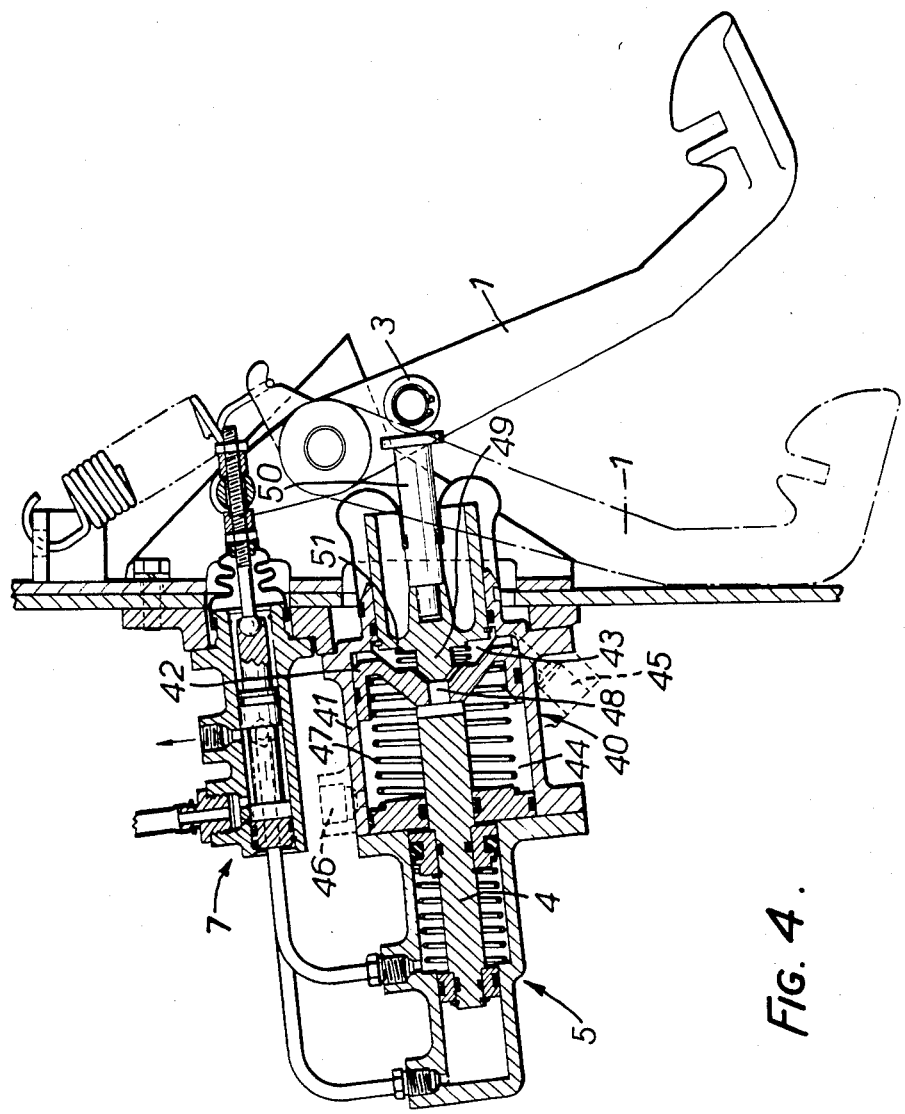
FIG. 4 is similar to FIG. 2 showing a modified assembly.

The modified assembly illustrated in FIG. 4 is the same as that of FIGS. 1 and 2 except a booster 40 is interposed between the pedal rollers 3 and the actuating rod 4 of the master cylinder 5. The booster comprises a housing 41, a piston 42 slidable in the housing and separating two chambers 43,44 having respective ports 45, 46. The piston is biased rearwardly by a spring 47 and has a central port 48 adapted to be closed by an input member 49 to which the actuating rod 50 is coupled. The port 48 is normally held open by a spring 51 interposed between the piston 42 and input member 49 so that pressure fluid supplied to port 45 can pass from chamber 43 to chamber 44 and to the outlet 46. Depressing either pedal displaces member 49 to close port 48 so that pressure builds up in chamber 43 and drives the piston 42 forwardly to actuate the master cylinder 5. The remaining operation of the master cylinder and selector valves 7 will be clear from the above description.

What is claimed is:

1. In a vehicle braking system having a pair of brake pedals, fluid operated brakes mounted on opposite sides of the vehicle, and a pair of fluid flow control devices coupled to respective pedals to be actuated thereby, said pedals being operable selectively either together to apply the brakes at both sides of the vehicle for normal retardation or separately to apply the associated brake at one side of the vehicle to assist vehicle steering, the improvement which comprises two fluid pressure sources respectively connected to the brakes on opposite sides of the vehicle, common actuating means for actuating both of said pressure sources when said pedals are operated either independently or together, and fluid reservoir means having a connection with each said pressure source through a respective one of said flow control devices, each flow control device being actuable by the pedal coupled thereto to close said connection between said respective pressure source and said reservoir means.

2. A vehicle braking system according to claim 1, wherein said brakes and said pressure sources normally communicate with said reservoir means through said flow control devices, and said communication is interrupted upon actuation of said control devices by said pedals.

3. A vehicle braking system according to claim 2, wherein said brakes are in constant communication with the respective pressure sources.

4. A vehicle braking system according to claim 3, wherein each said control device comprises a selector valve having a valve chamber with a first port connected to a respective one of said pressure sources, a second port connected to said reservoir means, and a third port connected to the associated brake, said first, second and third ports normally communicating with each other and said second port being closed when said pedal coupled to said selector valve is depressed.

5. A vehicle braking system according to claim 1, wherein means is provided for equalising the fluid pressures supplied to the brakes on opposite sides of the vehicle when both pedals are depressed together.

6. A vehicle braking system according to claim 5, wherein said pressure equalising means comprises a normally closed fourth port in each selector valve and means connecting together said fourth ports, each said selector valve being arranged to open the fourth port thereof when said valve is actuated by depressing the pedal coupled thereto.

7. A vehicle braking system according to claim 1, wherein said two pressure sources are provided by a tandem master cylinder.

8. A vehicle braking system according to claim 7, wherein said master cylinder has two pressure chambers with equal effective areas.

9. A vehicle braking system according to claim 8, wherein said master cylinder has two pistons for pressurising the respective chambers, said pistons being capable of limited relative movement for equalising the pressures in the respective chambers.

10. A vehicle braking system according to claim 1, wherein said pedals are each mounted to act directly against the common actuating means of said pressure sources.

* * * * *